April 4, 1950  R. F. CLEAVER  2,502,428
DEFLECTION ARRANGEMENT FOR OSCILLOGRAPHS
Filed May 4, 1946  3 Sheets-Sheet 1
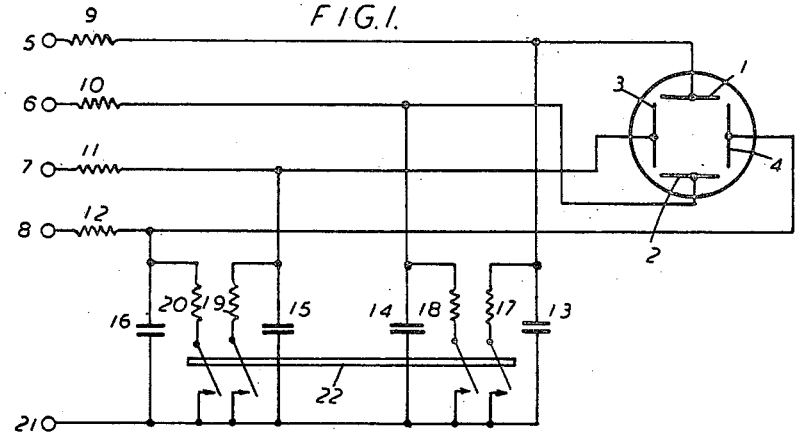
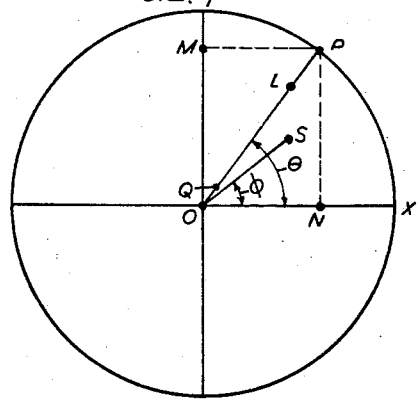
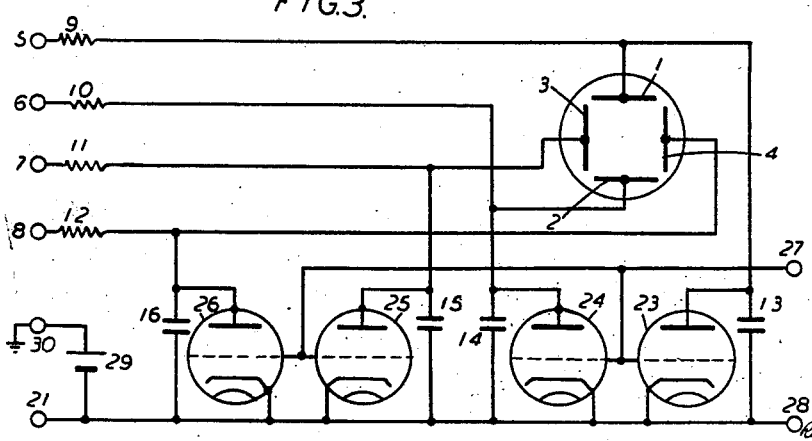
Inventor
Richard Francis Cleaver
By
Robert Harding Jr.
Attorney April 4, 1950        R. F. CLEAVER        2,502,428
DEFLECTION ARRANGEMENT FOR OSCILLOGRAPHS
Filed May 4, 1946        3 Sheets-Sheet 2
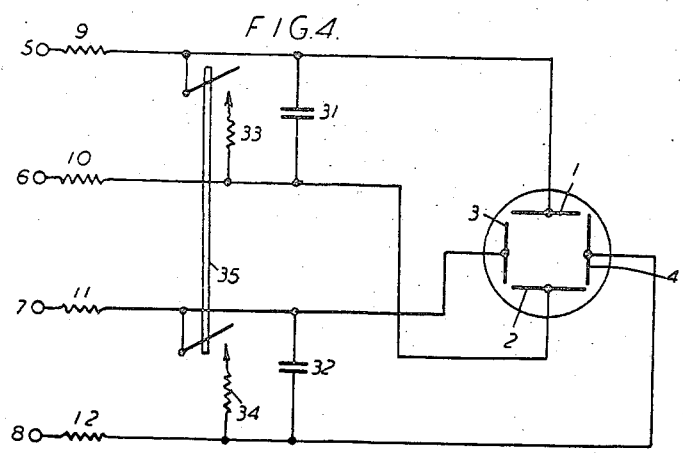
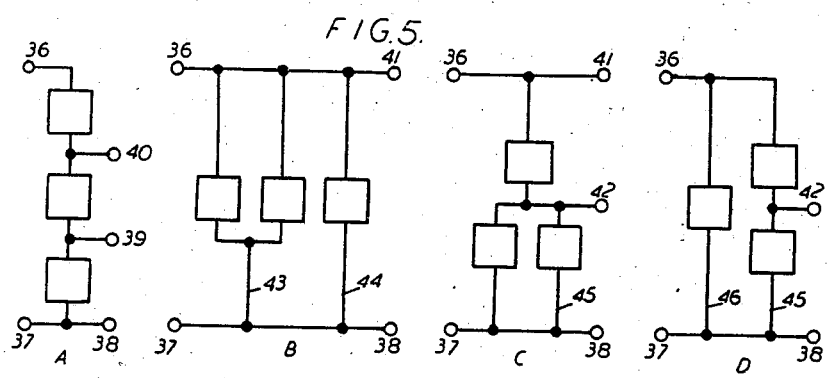
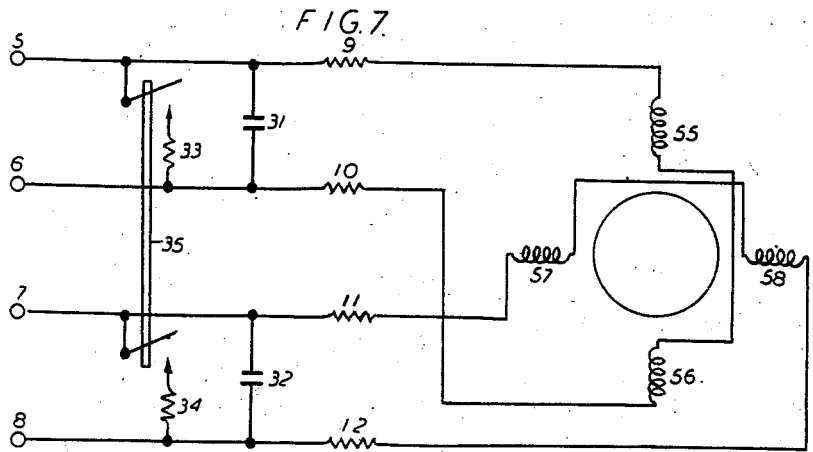
INVENTOR
BY Richard Francis Cleaver
ATTORNEY FIG.6
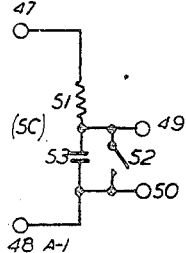 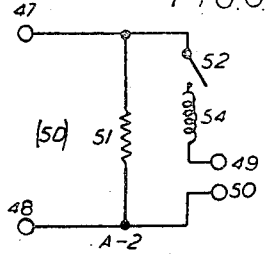 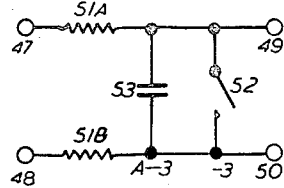
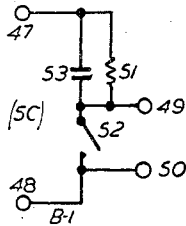 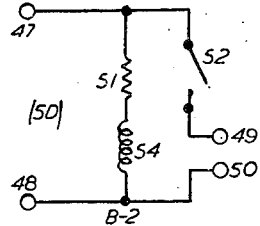 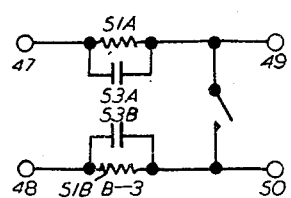
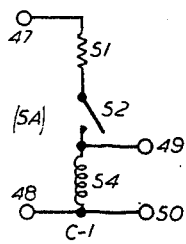 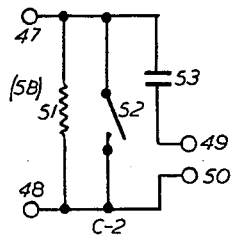 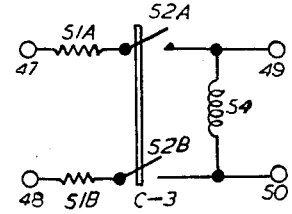
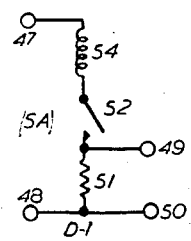 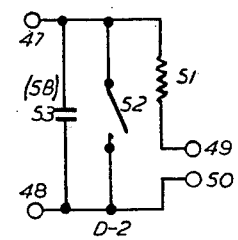 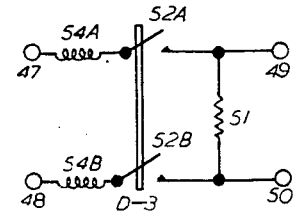
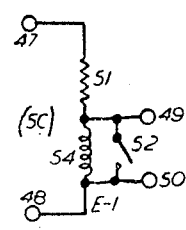 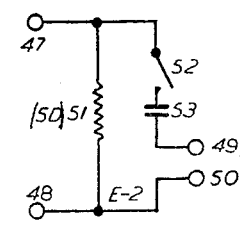 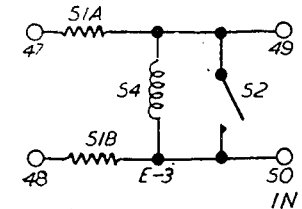
INVENTOR
Richard Francis Cleaver
BY
ATTORNEY

Patented Apr. 4, 1950

2,502,428

UNITED STATES PATENT OFFICE 2,502,428

DEFLECTION ARRANGEMENT FOR OSCILLOGRAPHS

Richard Francis Cleaver, London, England, assignor, by mesne assignments, to International Standard Electric Corporation, New York, N. Y., a corporation of Delaware Application May 4, 1946, Serial No. 667,259
In Great Britain April 14, 1945

Section 1, Public Law 690, August 8, 1946
Patent expires April 14, 1965

15 Claims. (Cl. 315—26)

The present invention relates to deflection arrangements for electric oscillographs.

Electric oscillographs, particularly those of the cathode ray type, are useful as indicators of electrical quantities. Thus in the case of a cathode ray oscillograph provided with electrostatic deflection, the potential difference between a pair of deflecting plates is given by the distance between the deflected and undeflected positions of the spot on the fluorescent screen. However, when the deflecting potential difference is unidirectional, and is constant, or varies only slowly, it may be inconvenient to determine its value from the deflected position of the spot because the undeflected position is not visible. For this reason, it is desirable that the deflection be indicated by a straight line trace, rather than by the position of a point. It is the principal object of the invention, therefore, to provide means whereby the application of a steady voltage or current for deflecting the tracing element of an oscillograph produces a line trace whose length is proportional to the deflecting quantity.

A case of particular interest is when a cathode ray oscillograph is used as an indicator in automatic direction finding equipment, in which two co-ordinate steady deflecting voltages characteristic of the direction to be indicated are respectively applied to the two pairs of deflecting plates of the oscillograph. In the ordinary way such an arrangement would deflect the spot on the oscillograph screen to some fixed point depending on the co-ordinate voltages, and the direction is indicated by an imaginary line joining the spot to the undeflected point, which is not visible. Such an indication is difficult to interpret, and what is required is a radial line trace which points in a direction corresponding to the actual direction to be indicated. The arrangements according to the invention which will be described permit such a radial trace to be obtained.

The invention accordingly provides an arrangement for producing a line trace on the screen of an electric oscillograph, the length and position of which trace are determined by the magnitudes of steady electric control currents or voltages applied to the said arrangement, comprising reactive elements associated with the deflecting elements of the said oscillograph for controlling the movements of the tracing element of the oscillograph, and periodic means for alternately storing in the said reactive elements energy derived from the said control currents or voltages and then discharging the said energy, resistance means being associated with the reactive elements during the storing and/or discharging process.

The invention will be described with reference to the accompanying drawings in which:

Fig. 1 shows diagrammatically a preferred arrangement according to the invention, for electrostatic deflection of the oscillograph ray;

Fig. 2 shows a diagram used in explaining the action of Fig. 1;

Fig. 3 shows a preferred practical form of Fig. 1;

Fig. 4 shows diagrammatically another form of Fig. 1;

Fig. 5 shows diagrammatically the possible basic forms of the deflecting circuits according to the invention;

Fig. 6 shows schematic circuit diagrams of a number of preferred forms of the deflecting circuits; and Fig. 7 shows an arrangement according to the invention for electromagnetic deflection of the oscillograph ray.

In the preferred arrangement shown in Fig. 1, the deflecting plates 1, 2, 3 and 4 of a cathode ray oscillograph of conventional pattern are supplied with steady deflecting potentials from the terminals 5, 6, 7 and 8 respectively, through resistances 9, 10, 11 and 12 respectively. The other parts of the oscillograph are not shown. The four plates are respectively connected to a point of common potential by four condensers 13, 14, 15 and 16. These condensers are provided with discharging resistances 17, 18, 19 and 20. The point of common potential is represented by the terminal 21, and a switch shown diagrammatically at 22 has four sets of simultaneously operated contacts adapted when closed to shunt each condenser by the corresponding discharging resistance. The switch 22 may be of any suitable type, either mechanical or electronic, for example.

Let $E_1$, $E_2$, $E_3$ and $E_4$ be the unidirectional potentials respectively applied to terminals 5, 6, 7 and 8 with respect to the terminal 21. These potentials may of course have either sign. Let $R_1$, $R_2$, $R_3$ and $R_4$ be the values of the resistances 9, 10, 11 and 12, and $r_1$, $r_2$, $r_3$ and $r_4$ those of resistances 17, 18, 19 and 20. Let $C_1$, $C_2$, $C_3$ and $C_4$ be the capacities of the condensers 13, 14, 15 and 16. By suitable means (not shown) the switch 22 is periodically operated to open and close the sets of contacts, so that each of the condensers C is periodically charged through the corresponding resistance R and then discharged through the corresponding resistance r. It follows that the cathode ray spot follows a trace on the oscillograph screen which will be determined by the potential changes of the four condensers. As will be explained later, the values of the circuit resistances and the capacities of the condensers can be chosen so that the spot on the fluorescent screen of the oscillograph makes a straight line radial trace having a direction and length determined by the potentials $E_1$ to $E_4$.

It will be assumed that the sources of the potentials $E_1$ to $E_4$ have impedances low compared with those of the load circuits to which they are connected, so that the values of the applied potentials are not appreciably dependent upon the currents drawn from the sources. In other words, these sources are "constant voltage" sources.

Referring to Fig. 2, let it first be supposed that all the contacts of the switch 22 are held open until all the condensers 13 to 16 are fully charged. Then the potentials of the four deflecting plates 1 to 4 of the oscillograph will be $E_1$ to $E_4$ respectively. Then if $K_1$ and $K_2$ are the deflection sensitivity factors of the plates 1, 2, and 3, 4 respectively, the cathode ray spot will be deflected from its undeflected position O to a point P the co-ordinates ON and OM of which are equal to $K_2(E_3-E_4)$ and $K_1(E_1-E_2)$ respectively. Then the angle $\theta$ between OP and OX is given by $$\tan\theta = \frac{K_1(E_1-E_2)}{K_2(E_3-E_4)}$$

Now suppose that all the contacts of the switch 22 be held closed until the condensers 13 to 16 are all substantially completely discharged. The potentials of the plates 1 to 4 will be respectively $$E_1 r_1/(R_1+r_1) = k_1 E_1$$
$$E_2 r_2/(R_2+r_2) = k_2 E_2$$
$$E_3 r_3/(R_3+r_3) = k_3 E_3$$
$$E_4 r_4/(R_4+r_4) = k_4 E_4$$

If the resistances $r_1$ to $r_4$ are small compared with the resistances $R_1$ to $R_4$, then the spot will return to a point very near to O, but this point will not in general be on OP unless the constants $k_1$ to $k_4$ are all equal. This is in practice most conveniently ensured by making all the resistances $r_1$ to $r_4$ equal to a value r and all the resistances $R_1$ to $R_4$ equal to another value R. In such a case the spot will be at the point Q on OP the co-ordinates of which are $kK_2(E_3-E_4)$ and $kK_1(E_1-E_2)$ where $k=r/(R+r)$.

Now suppose that the switch 22 be periodically operated so that the contacts are simultaneously opened and closed for respective alternate periods $t_1$ and $t_2$, so that the period of operation of the switch is $t_1+t_2$. If the switch be supposed to commence with the contacts closed and the condensers discharged, on opening the contacts the spot will be deflected from the point near O as the condensers charge up over a curve whose form depends upon the time constants of the respective charging circuits. In the general case this curve will not coincide with OP, but it can easily be shown that if the time constants of the four charging circuits are all equal then the spot follows the straight line OP. To show this, let the spot be at the point S at any time t after the opening of the contacts of the switch 22, and let OS make an angle $\phi$ with OX. The potential of the plate 1 at time t will then be $$k_1 E_1 + (E_1 - k_1 E_1)(1 - e^{-t/C_1 R_1}) =$$
$$E_1(1 - e^{-t/C_1 R_1}) + k_1 E_1 e^{-t/C_1 R_1}$$

with similar expressions for the potentials of the other four plates. It will be evident that the co-ordinates of the point S will in general be given by complex expressions involving all the four time constants. However, in the particular case when all the time constants are equal to CR and all the constants $k_1$ to $k_4$ are equal to k, it can be seen that the co-ordinates of the point S reduce to $$K_2(E_3-E_4)[1 - e^{-t/CR} + ke^{-t/CR}]$$

and $$K_1(E_1-E_2)[1 - e^{-t/CR} + ke^{-t/CR}]$$

so that $$\tan\phi = \frac{K_1(E_1-E_2)}{K_2(E_3-E_4)} = \tan\theta$$

so that S lies on OP for any value of t, and the spot follows the straight line OP during each charging period of the condensers.

The manner in which these conditions are most easily fulfilled is to make all the resistances $R_1$ to $R_4$ equal, all the resistances $r_1$ to $r_4$ equal and the capacities $C_1$ to $C_4$ of all the condensers also equal.

Since the condensers are allowed to charge for a period $t_1$ and are then discharged, the length of the trace along the line OP will depend on the factor $$[1 - e^{-t_1/CR} + ke^{-t_1/CR}]$$

If the time constant CR is made small compared with $t_1$, the length of the trace will be practically equal to OP, but the brightness will vary considerably, since the rate of change of the potential of the condenser will be very great at the commencement of the charging period and very small towards the end, so that the velocity of the spot will vary in the same manner. By making CR comparable with $t_1$, the length of the trace will be reduced, so that for example, the spot will only have time to reach a point such as L before the condensers are discharged, but the brightness of the trace will be more uniform. It may be possible to arrange so that the deflecting voltages $E_1$ to $E_4$ are of such magnitude that the point P would normally be well beyond the range of the oscillograph screen so that by suitable choice of the time constant CR, the point L would be conveniently on the screen and the brightness of the trace substantially uniform.

When the switch contacts are closed during the periods $t_2$, the condensers C will be rapidly discharged through the relatively small resistances r. It can probably be easily arranged so that the time constant Cr is very small compared with the period $t_2$ so that the condensers will be rapidly and substantially completely discharged before the recharging period commences. It will be evident that by choosing the resistances and condensers to be respectively equal as already suggested, the spot will rapidly return to the point Q and will follow the line OP. If it is not practicable to ensure that the resistances r are all exactly equal, the spot will not return exactly along OP, but if the resistances r are small, the velocity of return will be so great that the trace will be practically invisible.

It will, of course, be understood that the resistances $r$ will usually preferably be substantially zero, but this may not be practicable to achieve, particularly when an electronic switch is used.

The period $t_1+t_2$ of the switch 22 should be sufficiently short to produce a continuous visible impression, but should be long enough to enable convenient time constants $CR$ and $Cr$ to be chosen. This will not, however, be at all critical.

Fig. 3 shows a practical form of the arrangement of Fig. 1 in which the switch 22 is composed of four triods valves 23, 24, 25 and 26. The cathodes of these valves are connected to the terminal 21 and the anodes respectively to the upper terminals of the condensers 13, 14, 15 and 16 as shown. The control grids are all connected to a terminal 27 and an extra terminal 28 connected to the cathodes may be provided.

The circuit (not shown) from which the potentials of the terminals 5 to 8 and 21 are derived should be such that all the voltages $E_1$ to $E_4$ are positive under all working conditions. This ensures that the anodes of the valves 23 to 26 are always positive to the cathodes. An alternating switching voltage is applied between terminals 27 and 28 and thence between the control grids and cathodes of all those valves for the purpose of alternately blocking and unblocking them so that they act periodically in the manner of the switch 22 to charge and discharge the condensers 13 to 16. The wave-form of the switching voltage may be suitably chosen so that all the valves are simultaneously and sharply blocked and unblocked. This wave may for example consist of a train of substantially rectangular blocking pulses of duration $t_1$ and period $t_1+t_2$.

In a particular application of the circuit of Fig. 3, two pairs of voltages, the voltages of each pair being equal and opposite with respect to ground, are developed in a direction indicating circuit and are applied respectively to the terminals 5, 6, and 7, 8. In order to arrange that all the voltages $E_1$ to $E_4$ shall be positive, a negative biassing voltage of magnitude greater than the maximum voltage to ground of any of the terminals 5, 6, 7 or 8 may for example be applied to terminal 21 as shown, from a source 29 connected to ground at 30. This may be done in any other convenient way. A radial trace is then obtained on the oscillograph screen oriented in accordance with the values of the pairs of balanced voltages and therefore giving the desired direction indication.

It has been found that in certain types of oscillograph, with this arrangement the focus of the spot is variable as it describes the trace, because the mean potential of the four deflector plates rises continuously during the discharging cycle. In these cases, the best focus is usually obtained when the mean potential of the plates is about the same as that of the third anode (not shown) of the oscillograph. Since for the purpose of giving a clear indication the focus should be sharpest at the tip of the trace, the potential of the third anode should preferably be adjusted so as to be approximately equal to the maximum value of the mean potential of the deflector plates. With this adjustment the size of the spot is greatest when it is at the point Q (Fig. 2) and its size then depends upon the voltage of the source 29; and if this voltage is large the spot may be quite large. A conveniently tapering indicating trace which is sharp at the tip may therefore be obtained by suitable adjustment of the potential of the terminal 21.

It will be seen that with the arrangement of Fig. 3, the resistances $r_1$ to $r_4$ are represented by the internal anode-cathode resistances of the valves; and though they may be sufficiently small, they cannot generally approximate to zero. In practice also, it may be difficult to find a set of valves in which these resistances are all equal. However, as already explained, if the time constant $Cr$ is made small enough, the return traces will scarcely be visible even though they may not coincide exactly with the line OP.

A somewhat simpler switching arrangement according to the invention is shown in Fig. 4. In this case only two condensers 31 and 32 connected directly between the plates 1, 2 and the plates 3, 4 are required, and two corresponding small discharging resistances 33 and 34, with two corresponding sets of contacts for the periodically operated switch 35. As in the case of Fig. 1, a straight line trace is obtained if the resistances 9 to 12 are all equal, and if the capacities of the condensers 31 and 32 are equal. The small resistances 33 and 34 should also preferably be equal or zero.

This arrangement gives the same results as Fig. 1 but is less well adapted for operation by an electronic switch owing to the unidirectional nature of the valves which have to be used. The switch 35 (as also the switch 22 in Fig. 1) can be an appropriate mechanical switch or commutator. Either switch could for example consist of one or more relays operated by alternating or intermittent current and adapted to control simultaneously the necessary sets of contacts. If valves were used in Fig. 4 for switching, two reversed and parallel connected valves would have to be used instead of each switch contact, and the application of the switching voltage to the valve grids is less simple. The arrangement is then less satisfactory and on the whole more complicated than that of Fig. 3 and does not exhibit any other advantages, except that the mean potential of the deflector plates is or can be zero so that the trace is constantly in focus.

While the arrangements which have been described with reference to Figs. 1 to 4 represent the preferred arrangements, the charge and discharge circuits can be arranged in a number of other ways. The arrangements which have been described are suitable for electrostatic deflection of the cathode ray, but suitable circuits may be also selected for electromagnetic deflection. Two series of circuits are possible, in one of which the reactive element is a condenser, and in the other it is an inductance.

Each of the charge and discharge circuits which have been described includes three elements, namely a resistance, a reactive element, and a switch which may have a small resistance when closed. Fig. 5 shows the four possible different ways in which three such elements may be connected to the source of the unidirectional potential E. Of these four arrangements, B is the inverse of A and D is the inverse of C. The three elements are represented as similar blocks, and it should be understood that the three elements may be permuted in all possible ways in each arrangement, and the reactive element may have a positive or a negative reactance.

Not all of these possible arrangements are in effect different, and not all of them are suitable for the purpose of the invention; certain of them which are suitable will be selected and described below.

In the circuits A, B, C, D of Fig. 5, the source (not shown) is intended to be connected to terminals 36 and 37. In the case of electrostatic deflection and deflecting potential will be the potential across one or across two of the elements while in the case of electromagnetic deflection, the deflecting current will be the current through a deflecting coil which will be connected in series with one of the elements or in series with the parallel combination of two of them. Thus in Fig. 5A the deflecting voltage can be obtained from terminals 38 and 39 or from terminals 38 and 40, in Fig. 5B the deflecting voltage can be obtained from terminals 38 and 41, in Fig. 5C it can be obtained from terminals 38 and 42 or from terminals 41 and 42, while in 5D it can be obtained from terminals 38 and 42. The circuits of Fig. 5B are, however, not really suitable for electrostatic deflection because the switch periodically short-circuits the source of the applied voltage. For electromagnetic deflection, the deflecting coils would be connected in series with the three elements in Fig. 5A, in series with conductor 43 or 44 in Fig. 5B, in series with conductor 45 in Fig. 5C and in series with conductor 45 or 46 in Fig. 5D These include all the effectively different possibilities, it being assumed that all possible permutations of the elements are adopted.

As in the case of the circuits used for electrostatic deflection, the source of the deflecting voltages was assumed to be a "constant voltage" source of low impedance, so in the case of the circuits used for electromagnetic deflection it will be assumed that the source of the deflecting currents is a "constant current" source of high impedance so that these currents are not appreciably affected by the voltages developed in the load circuit.

By considering the type of wave-form produced by these circuits it can be shown, for example, that for the purpose of obtaining a trace which is reasonably uniform in brightness and without discontinuities none of the Fig. 5A arrangements are suitable for electrostatic deflection when the reactance is negative, because once the reactance becomes charged the output potential is constant at a maximum or minimum value irrespective of the switch position. Likewise none of the circuits of Fig. 5B are suitable for electromagnetic deflection when the reactance is positive, because once the current from the constant current source is established in the reactance the switch has no effect on the current (if any) through the deflecting coils. Further, as already stated, the arrangements of Fig. 5B have the objection that the source is periodically short-circuited, and this generally rules out these circuits when electrostatic deflection is used. Similarly, the arrangements of Fig. 5A are likely to be ruled out for electromagnetic deflection because the constant current circuit is periodically interrupted, which may react undesirably on the source. In both cases the result is that either full deflection or no deflection is produced, according to the switch position. Fig. 6 accordingly shows a recommended selection of circuits which fulfil the conditions for obtaining a satisfactory uniform trace, though it does not follow that some of those not included could not be used when a trace with other characteristics is required.

The conditions to be fulfilled for a suitable type of trace may be stated as follows:

1. During each switching cycle the deflecting potential or current should rise or fall without discontinuities by an amount which is not much less than the applied continuous potential or current so that the cathode ray spot will be deflected from the no deflection point to a point not far from the point to which it would be deflected by the continuously applied input potential or current. The rate of change of the potential or current should be substantially independent of the resistance of the switch when closed, so that when two or more deflecting circuits are associated with synchronized switches the shape of the trace is not affected by small differences between the switch resistances.

2. The deflecting potential or current should be constant at a zero or other fixed value for an appreciable part of the switching cycle. This ensures that the radial trace starts from a well defined point on the oscillograph screen.

3. In the case of electrostatic deflection the circuit should preferably present a high impedance to the source so as to minimize reaction thereon, particularly when the source is itself of high impedance. In the case of electromagnetic deflection for analogous reasons it may be desirable that the circuit should present a low impedance to the source.

In Fig. 6, the circuits in column 1 are intended for electrostatic deflection; the corresponding circuits in column 2 are the inverse circuits suitable for electromagnetic deflection and those in column 3 are the balanced forms of those in column 1. In all these circuits the input terminals to which the deflecting source (not shown) is to be connected are 47 and 48, and the corresponding output terminals to which the deflecting plates or coils of the oscillograph (not shown) are to be connected are 49 and 50. The resistance elements are designated 51, the switch 52, the negative reactive element 53 and the positive reactive element 54. In the balanced circuits, where any element is duplicated, the two elements are distinguished by letters A and B. To each of the circuits in columns 1 and 2 the reference number of the corresponding basic circuit of Fig. 5 has been added in brackets.

It will be seen that circuits A—1 and A—3 are those used in Figs. 3 and 4 respectively, and are the preferred circuits for electrostatic deflection. Circuit A—2 gives an equivalent result for electromagnetic deflection. It should be noted that in circuits A—1, B—1, C—2, D—2 and E—1, the tracing stroke commences when the switch opens, while in the other circuits it commences when the switch is closed. Furthermore, in circuits C and E, the cathode ray spot is swept rapidly outwards on operation of the switch immediately before the start of the tracing stroke, and then travels inwards towards the centre instead of outwards as in the case of the other circuits. In these circuits condition 1 is not completely satisfied because the operation of the switch at the end of the tracing stroke causes an appreciable discontinuity in the output wave, and a negative transient, unless the time constant I/R has been carefully chosen. This discontinuity produces a gap in the trace. The negative transient could be cut off by the use of a suitably directed diode or other rectifier connected across the output terminals 49 and 50. With these circuits the time constant L/R should be short compared with the time during which the switch is operated for the tracing stroke (for example about 0.2 of this time for a 1% gap in the trace). The greater part of the trace would be made in a small fraction of the cycle and it would therefore be relatively faint. The balanced form of the C circuit is also unsuitable because the switch contacts occur in the conductors leading in the deflecting plates of the oscillograph. This also applies to the D circuit, which is otherwise practically equivalent to the preferred A circuit.

It should be noted that the resistance of the inductive element 54, which has been neglected so far, may modify the operation of the circuit, particularly in the circuits C—I and E—I. The coil resistance should in any case be small compared with that of the resistance element 51, but it will generally be large compared with the resistance of the switch when closed. If the coil resistance is too large, it may aggravate the discontinuity in the trace referred to above.

Of the circuits which have been shown in Fig. 6, the A circuits are preferred as already mentioned, but the B and D circuits are very nearly as good (except that the balanced form D—3 is less suitable for the reasons already given). In order to obtain wave forms similar to that given by the preferred circuit, one of the circuits A—I, B—I, or D—I, or A—3, B—3 or D—3, may be used for electrostatic deflection, and A—2, B—2, or D—2 may be used for electromagnetic deflection.

It should be pointed out that the E circuit of Fig. 6 theoretically will not work if the reactive element is pure. In the case of circuits E—I and E—3, for example, unless the inductance 54 has a resistance associated with it which is at least comparable with the resistance of the switch 52, closing the switch will not appreciably affect the current when it has become fully established. In practice, however, the inductance will most likely have sufficient resistance to enable the circuit to work without much modifying the curves produced, or a small series resistance may be added. Likewise in the circuit E—2, the condenser 53 should have a small leak otherwise its potential will ultimately become constant and opening and closing the switch will have no effect. Thus to make this circuit workable, it will probably be necessary to shunt the condenser with a high resistance.

Referring again to Fig. 3, it will be evident that the circuit can be easily adapted for the use of B—I type circuits by connecting each of the condensers 13, 14, 15 and 16 in parallel with the corresponding one of the resistances 9, 10, 11 and 12 instead of to the common terminal 21 as shown. It can also be easily adapted for type E—I circuits by replacing each of the condensers by an appropriate inductance. Other types of switch beside the valves shown can be used for any of these circuits.

Fig. 7 gives one example of an arrangement according to the invention for electromagnetic deflection using discharge circuits of type D—2 (Fig. 6). The arrangement is very similar to Fig. 4, and corresponding elements have been given the same designation numbers. Fig. 7 differs from Fig. 4 in that the resistances 9, 10, 11 and 12 are placed on the other side of the condensers 31 and 32. It will be understood that the two resistances in each half of the circuit correspond to the single resistance 51 of Fig. 6, D—2. One pair of deflecting coils 55 and 56 of the oscillograph are connected in series with the resistances 9 and 10, and the other pair 57 and 58 are connected in series with the resistances 11 and 12. The two sources of direct deflecting current are intended to be connected respectively to the pairs of input terminals 5, 6, and 7, 8. As explained with reference to the preceding figures, a radial trace will be obtained on the oscillograph screen whose direction is determined by the values of the two direct deflecting currents.

It will be understood, of course, that any of the other circuits of column 2 of Fig. 6 could be suitably arranged for electromagnetic deflection along similar lines to Fig. 7. The switch 35 can be of any suitable type. If the sources of direct current are such that each may have one terminal earthed, for example terminals 6 and 8, the switch 35 could evidently be an electronic switch similar to that shown in Fig. 3, but with only two valves having their cathodes connected to terminals 6 and 8 respectively, and the anodes to terminals 5 and 7 respectively.

What is claimed is:

1. An arrangement for producing a line trace on the screen of a cathode ray oscillograph depending in length and position on the magnitudes of steady deflecting currents applied to the said arrangement, said oscillograph comprising cathode ray deflecting coils, comprising condensers associated with the deflecting coils of the oscillograph, periodic switching means for applying the said currents to charge the said condensers and for discharging them simultaneously in alternate periods of time, resistances associated with the said condensers for controlling the rate of charge or discharge of the condensers, and means for applying the variations in the condenser charges to produce corresponding variations in the currents flowing through the deflecting coils.

2. An arrangement for producing a line trace on the screen of a cathode ray oscillograph depending in length and position on the magnitude of steady deflecting voltages applied to the said arrangement, said oscillograph comprising cathode ray deflecting plates, comprising inductances associated with the deflecting plates of the oscillograph, switching means for applying the said voltages to store magnetic energy in the said inductances and for discharging the said energy in alternate periods of time, resistances associated with the said inductances for controlling the rate of storage or discharge of the energy therein and means for applying the potenital variations produced in the said inductances to produce corresponding variations in the voltages applied to the said deflecting plates.

3. An arrangement for producing a line trace on the screen of a cathode ray oscillograph depending in length and position on the magnitudes of steady deflecting voltages applied to the said arrangement, said oscillograph comprising cathode ray deflecting plates, comprising condensers connected to the deflecting plates of the oscillograph, periodic switching means for alternately charging the said condensers from the said voltages and then discharging the said condensers simultaneously, resistances for controlling the charging or discharging of the said condensers, and means for applying the potential variations of the said condensers to the said deflecting plates.

4. An arrangement according to claim 3 comprising two pairs of deflecting plates each of which plates is connected to a terminal for the application thereto of a deflecting voltage, two condensers each of which is connected between the plates of a corresponding one of the said pairs, and a charging resistance connected in series between at least one plate of each pair and the corresponding terminal.

5. An arrangement according to claim 3 comprising two pairs of deflecting plates each of which is connected through a charging resistance to a terminal for the application thereto of a deflecting voltage, four condensers each of which connects one of the plates to a common terminal, and a switch adapted periodically to discharge all of the said condensers simultaneously.

6. An arrangement according to claim 3 comprising discharging resistances associated respectively with the said condensers through which the said condensers are respectively discharged by the said switch.

7. An arrangement according to claim 3 in which the said periodic means comprises an electronic switch and means for applying an alternating voltage for periodically operating the said electronic switch.

8. An arrangement according to claim 3 comprising means for polarising the said common terminal in such manner as to render it negative to all the other terminals, four grid controlled electron discharge devices having anodes connected respectively to the four plates and the cathodes to the common terminal, and means for applying an alternating voltage between the control grid and cathode of each of the said devices of sufficient magnitude alternately to block and unblock the said devices.

9. An arrangement according to claim 3, in which the time constants of the charging circuits associated with all of the said condensers are equal.

10. An arrangement according to claim 3 in which all the said charging resistances are substantially equal, all the said discharging resistances are substantially equal, and the capacities of all the said condensers are substantially equal, the said charging resistances being large compared with the said discharging resistances.

11. An arrangement according to claim 3 in which the potential of the said common terminal is substantially equal to the maximum value of the mean potential of the four deflecting plates.

12. An arrangement according to claim 1 comprising two pairs of deflecting coils for the said oscillograph, means for connecting each pair of coils in series with a resistance to the source of the corresponding deflecting current, means for shunting each source with a condenser and with a discharging switch, and means for simultaneously and periodically opening and closing the said discharging switches.

13. An arrangement for producing a line trace on the screen of an electric oscillograph having deflecting means, the length and position of which trace are determined by the magnitudes of steady electric control signals applied to the deflecting means, comprising separate means for applying separate control signals to each of the deflecting means, electric storage means associated with said first-mentioned means for controlling the magnitudes of the signals applied to the deflecting means, resistance means associated with said storage means for controlling the storing and discharging thereof, and periodic means for simultaneously storing and discharging energy from the control signals stored in all of said storage means.

14. An arrangement according to claim 13 wherein said resistance means comprise electric discharge valves connected across each of said storage means and said periodic means comprises a single means for applying an alternating switching voltage to the control grids of all of said valves for simultaneously alternately blocking and unblocking said valves, thereby charging and discharging said condensers.

15. An arrangement according to claim 13 wherein said storage means comprises condensers.

RICHARD FRANCIS CLEAVER.

REFERENCES CITED

The following references are of record in the file of this patent:

UNITED STATES PATENTS

| Number | Name | Date |
| --- | --- | --- |
| 2,297,949 | Farnsworth | Oct. 6, 1942 |
| 2,318,197 | Clark | May 4, 1943 |
| 2,406,858 | Shepherd et al. | Sept. 3, 1946 |
| 2,421,312 | Bobb | May 27, 1947 |
| 2,423,661 | Rhea | July 8, 1947 |